United States Patent Office 3,253,948
Patented May 31, 1966

3,253,948
GLASS FIBER PRODUCT
Ralph L. Tiede, Newark, Ohio, assignor to Owens-Corning Fiberglas Corporation, a corporation of Delaware
No Drawing. Filed Feb. 12, 1962, Ser. No. 172,790
4 Claims. (Cl. 117—126)

This invention relates to a glass fiber product, and, more particularly, to such a product which includes glass fibers of a particular composition and as associated binder which includes a particular silane or reaction product thereof.

Various products have been made from glass fibers and aqueous phenolic binders. A major area of products of this type can be described as wools and boards wherein intermeshed fibers are bonded to one another at points of contact by a hardened phenolic binder. In general, wool-like products are produced by co-depositing fibers and a hardenable binder on a foraminous conveyor and then heating the binder to cause hardening thereof to an infusible state. Board products are formed in generally the same manner, but the heating step to cause cure of the binder is carried out while the mass of fibers and associated binder is compressed, so that the final product is more rigid and denser as a consequence of the compression.

It has long been recognized that the composition of a glass from which fibers are produced is a critical variable in the production of glass wool and glass fiber boards. For example, the glass composition must be such that a melt thereof has viscosity characteristics at a suitable working temperature such that streams of the melt can be drawn or forced through minute openings and the streams can be drawn to a desired fiber diameter. In addition, the melt must not devitrify under practical working conditions, and the final product must have a reasonable degree of "durability," or must be stable without significant deterioration during a reasonable service life. Ordinary soda lime or bottle glass is an example of a glass which has the requisite high temperature viscosity characteristics at a practical working temperature at which it does not devitrify, so that fibers can be produced therefrom. However, fibers made from soda lime glass deteriorate so rapidly that they are useless for the production of glass wool, glass board and the like.

It has been found, in general, that reducing the alkali metal content of a glass tends to increase the durability thereof, but disadvantageously affects the high temperature viscosity or devitrification characteristics, or both. It has also been found that substituting some $B_2O_3$ for a part of the alkali metal oxides in a glass improves the durability of glass fiber products made therefrom without disadvantageously affecting the high temperature viscosity and devitrification properties (see, for example, Bowes Patent 2,308,857), and that mixtures of $B_2O_3$ and $TiO_2$ can be similarly substituted, and with similar results (see, for example, Dingledy Patent 2,664,359). Adding alumina to a glass also tends to improve the durability of wools and boards produced therefrom, but also disadvantageously affects the high temperature viscosity or devitrification characteristics, or both. As a consequence of the considerations discussed above, glasses that have heretofore been used for producing glass fiber wools, glass fiber boards and the like have usually included $B_2O_3$, alumina, alkali metal oxides and alkaline earth metal oxides, and sometimes $TiO_2$, in proportions adjusted to achieve the requisite high temperature viscosity and devitrification characteristics without unreasonably affecting "durability," in addition to silica as a primary constituent.

The instant invention is based upon the discovery of an unexpectedly great cooperation between a particular silane or a reaction product thereof and fibers of a glass which is low, by comparison with previously known fiberizable glasses having satisfactory "durability" properties, in $B_2O_3$ and in $Al_2O_3$. As a consequence of this unexpectedly great cooperation, glass fiber wools, boards and the like having the requisite degree of durability can be produced from such glasses if the silane or the like is employed as a constituent of a binder composition that is used.

It is, therefore, an object of the invention to provide an unexpectedly useful article which is a mass of intermeshed or felted glass fibers wherein individual fibers are bonded to one another by a particular, hardened binder composition.

It is a further object of the invention to provide a method for producing an unexpectedly useful mass of intermeshed or felted glass fibers, which method includes the use of a particular binder composition.

Other objects and advantages will be apparent from the description which follows, which is intended only to illustrate and disclose, and in no way to limit the invention.

According to the invention glass fibers having a hardened adhesive coating on their surfaces are provided. The coating comprises a resite and from 0.02 percent[1] to 2.0 percent of gamma-amino propyl triethoxy silane or equivalent, or a reaction product thereof, based upon the weight of the coating. The glass fibers consist essentially of from 53 percent to 62 percent of $SiO_2$, from 4 percent to 8 percent of $Al_2O_3$, from 18 percent to 22 percent of CaO, from 5 percent to 9 percent of MgO, and from 9 percent to 13 percent of $Na_2O$, $K_2O$ and $Li_2O$. In addition, the glass may contain as much as, but not more than, 2 percent of $B_2O_3$, limited amounts of MnO and $TiO_2$, e.g. up to about 0.5 percent of each, and usually will include a small amount of $Fe_2O_3$, which is present as an impurity. The sum of $Al_2O_3$ and $SiO_2$, as well as the sum of $Al_2O_3$, $SiO_2$ and $B_2O_3$, must be from 59 percent to 66 percent. Preferably, the glass contains from 19 to 21 percent of CaO, and from 6 to 8 percent of MgO.

As has been indicated above, fibers according to the invention have a hardened coating comprising a resite and, for example, gamma-amino propyl triethoxy silane or a reaction product thereof. The resite is produced by curing a resole to an infusible, crosslinked condition, usually in a heated oven which operates at atmospheric pressure. The resole must be heat hardenable, which necessitates a comparatively high formaldehyde to phenol ratio, e.g. at least about 1.25:1, but usually not greater than about 2.5:1. The resole must be water soluble or dispersible, and can be made by condensing phenol with formaldehyde or by condensing phenol, an amino com- ---
[1] The terms "percent" and "parts" are used herein, and in the appended claims, to refer to percent and parts by weight, unless otherwise indicated.

pound and formaldehyde, and, in either case, in the presence of an alkaline condensing agent such as sodium hydroxide, sodium carbonate, barium hydroxide, or the like. A general definition of resoles can be found on page 87 of The Chemistry of Phenolic Resins, Martin, John Wiley & Sons, Inc., New York, New York, 1956.

As is also indicated above, the hardened adhesive coating must also include from 0.02 percent to 2 percent of gamma-amino propyl triethoxy silane or equivalent, or a reaction product thereof. Optimum results have been obtained when the gamma-amino propyl triethoxy silane or equivalent has been used within the range of from 0.05 percent to 0.5 percent, based upon binder solids. In addition, various other materials can be used in the binder composition, and frequently are, to modify specific properties, for example the processing characteristics of a binder composition or the nature and properties of the final hardened, adhesive coating produced therefrom. Such constituents as pinewood pitch extract, tall oil pitch having a flash point from 400° F. to 550° F., ammonium hydroxide, emulsified mineral oil, ammonium sulfate and various dyes can be employed, and do not affect the unexpectedly great improvement in properties attributed to the use of the gamma-amino propyl triethoxy silane or equivalent with the particular glass composition.

It will be appreciated that gamma-amino propyl triethoxy silane and equivalents are capable of hydrolysis. Since, in accordance with the invention, they are used in an aqueous coating system, it is possible that hydrolysis occurs before the coating is finally applied to glass fibers. However, ethoxy groups of a silane are comparatively difficultly hydrolyzed, for example by comparison with chloro groups, complete hydrolysis thereof usually proceeding readily only in the presence of an agent such as hydrochloric acid which accelerates the reaction. Since binder compositions with which the silane is used in accordance with the invention are usually of such a nature that they do not tend to accelerate the hydrolysis of an ethoxy or other alkoxy silane, it is probable that only partial hydrolysis proceeds prior to the application of the compositions to the fibers. However, when a binder composition comprising gamma-amino propyl triethoxy silane or an equivalent is applied to glass fibers, as described above, and heated in a suitable curing oven to convert the binder to a hardened, infusible condition, it is believed that substantially complete hydrolysis of the silane occurs prior to completion of the hardening of the binder. It is known that the rate of hydrolysis is a direct function of temperature. Since hardening of the binder composition is usually carried out at a temperature of at least 300° F., and often at a temperature near 400° F., and since any silane or reaction product molecule which has unhydrolyzed alkoxy groups as a part of its molecular structure is heated in an aqueous system during the initial portions of this curing cycle, substantially complete hydrolysis is believed to occur. In this connection, it should be noted that the rate of hydrolysis of the three ethoxy groups of gamma-amino propyl triethoxy silane differs substantially, a first being rather readily hydrolyzed, a second being hydrolyzed considerably more slowly than the first, and a third being hydrolyzed considerably more slowly than the second.

Neither the precise chemical structure of the silane hydrolysis or reaction product nor the mechanism of its attachment, if any, to the glass fibers is fully understood. It will be appreciated that a chemical linkage of the Si—O—Si type between a silicon atom from a silane and a glass surface can be hypothecated. For example, condensation between a silanol group from the silane and a silanol group which probably exists adjacent a glass fiber surface would provide such a chemical bond. It is doubted, however, that such a bond actually exists to any significant extent, as the adhesion that can be measured appears to be more of the order that would be expected from the attraction that can be attributed to hydrogen bonding or to Van der Waals forces. It is also possible that the silanol groups which are believed to be formed by hydrolysis, as discussed above, condense with one another to form siloxane or silicone groups, and, finally, it is probable that at least some of the amino groups from the silane are chemically bonded into the phenolic resin molecule through methylene groups. It will be apparent from the foregoing that the reactions which are responsible for the unexpected improvement achieved in accordance with the instant invention are too complicated and too little understood for a reliable chemical definition of the final product to be possible.

As has been pointed out above, the composition of the glass fibers is critical. Specifically, the fibers are low in both $Al_2O_3$ and $B_2O_3$. In fact, if the fibers are used with a binder composition which does not include gamma-amino propyl triethoxy silane or equivalent to the extent of at least 0.02 percent, the fibers have such poor "durability" characteristics that they are unsuited for the production of wool, board and the like products. Furthermore, the durability is so low that the percentage of improvement that can be achieved by using one of the indicated silanes on a conventional glass, usually one that is higher in alumina content or $B_2O_3$ content, or both, would be insufficient to make the durability satisfactory. However, on fibers having a composition within the ranges previously set forth, the effect of one of the indicated silanes is significantly more marked than on conventional glass fibers. As a consequence of this unexpected phenomenon, glass fibers of the indicated compositions, when used with one of the indicated binders, have the requisite degree of durability.

The durability of particular glass fibers with a particular binder composition can be determined by a fiber binder test.[2] It has been found that there is an excellent correlation between the results of the fiber binder test and durability under actual service conditions of glass fiber products made with the fiber-binder system tested. The actual magnitude of strengths, wet and dry, as determined by the test, is not particularly important, because numerous unimportant factors influence the numerical results. However, at least in the case where the consequence of changes in glass composition is being investigated, it is sufficient to compare wet and dry fiber binder strengths achieved with a particular glass and a particular binder system with the results achieved with a glass known to have satisfactory durability properties and the same binder system. Although the fiber binder strength might differ substantially if the test were repeated with a different binder sample, or even with the same binder sample at a different time, the results with each of the two glasses would differ by about the same proportion, so that a valid comparison could still be made. It will be apparent from the foregoing discussion, however, that no valid comparison can be made between results at any given time and results obtained at some other given time.

The nature of the unexpectedly great cooperation between a phenolic binder composition which includes an amino-alkyl silane will be apparent from the following example, which is presented solely for the purpose of illus-

---

[2] The fiber binder strength for particular fibers relative to a particular binder is determined by applying the binder to continuous glass fibers as they are formed, collecting a total of 3150 of the coated fibers in a bundle, immersing the entire bundle in the binder, allowing excess resin to drain from the bundle, drying for one hour, curing the binder for ten minutes at 400° F., and then measuring the force required to break the bundle. The bundle is broken while supported at two points, one inch apart, by applying a force to the bundle at a point midway between the two support points, or one-half inch from each. The applied force is increased at the rate of about 320 grams per minute until the bundle breaks. The force in grams, at the time of breaking, is considered to be the fiber binder strength. "Dry" fiber binder strength is determined on the bundle as initially cured, while "wet" fiber binder strength is determined after subjection of the bundle to an atmosphere of substantially 100 percent relative humidity at a temperature of about 120° F. for a period of one hour.

trating and disclosing the invention, and is in no way to be construed as a limitation thereon.

*Example*

Fibers were drawn from glasses of various compositions and subjected to the previously described fiber binder test using different binder compositions. The chemical compositions of the several glasses are set forth in the following table:

TABLE I

[Composition in parts]

| Composition No. | $SiO_2$ | $Al_2O_3$ | CaO | MgO | $B_2O_3$ | $Na_2O$ $K_2O$ $Li_2O$ | MnO | $TiO_2$ | BaO | $Fe_2O_3$ |
|---|---|---|---|---|---|---|---|---|---|---|
| 1 | 53.53 | 7.94 | 20.06 | 6.91 | | 10.99 | 0.24 | 0.12 | | 0.21 |
| 2 | 53.6 | 7.0 | 20.6 | 5.0 | 2.0 | 11.5 | | | | 0.3 |
| 3 | 54.41 | 5.05 | 20.27 | 6.69 | 1.59 | 11.68 | | | | 0.3 |
| 4 | 54.72 | 5.28 | 20.75 | 6.66 | | 12.25 | | | | 0.3 |
| 5 | 54.75 | 6.86 | 19.83 | 6.82 | 0.53 | 10.65 | 0.25 | 0.12 | | 0.2 |
| 6 | 55.47 | 4.68 | 20.38 | 7.12 | | 10.95 | 0.27 | 0.14 | 0.81 | 0.2 |
| 7 | 55.64 | 5.36 | 19.85 | 6.85 | | 11.14 | | | 0.84 | 0.3 |
| 8 | 55.97 | 5.77 | 19.59 | 6.72 | 1.07 | 10.31 | 0.26 | 0.13 | | 0.2 |
| 9 | 56.11 | 5.41 | 20.02 | 6.91 | | 11.23 | | | | 0.3 |
| 10 | 56.27 | 5.42 | 20.15 | 6.95 | | 10.56 | 0.3 | 0.2 | | 0.2 |
| 11 | 57.20 | 4.69 | 19.36 | 6.63 | 1.60 | 9.97 | 0.26 | 0.13 | | 0.2 |
| Control | 59.15 | 3.67 | 8.10 | 3.00 | 10.73 | 15.05 | | | | 0.3 |

Glass fibers having the compositions set forth in the foregoing table were subjected to the fiber binder test, using approximately a 10 percent resin solids solution of a phenolic resin. Fibers of each composition were tested with the resin alone, and with the resin plus 0.05 percent of gamma-amino propyl triethoxy silane, based upon resin solids. The phenolic resin was prepared from 180 parts of formalin, or 37 percent water solution of formaldehyde, 100 parts of phenol and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The sodium hydroxide in the reaction mixture was then neutralized with phosphoric acid, and the neutralized resin was filtered to remove precipitated sodium phosphate.

The results of the foregoing tests are summarized in the following tables wherein groups of tests which were run concurrently and are, therefore, comparable, are grouped together in each of the several tables:

TABLE II

| Composition No. | Fiber Binder Test Results | | | | Increase in Wet Strength with Silane | |
|---|---|---|---|---|---|---|
| | Without Silane | | With Silane | | | |
| | Dry | Wet | Dry | Wet | Grams | Percent |
| Control [1] | 431 | 282 | 481 | 353 | 71 | 25.2 |
| 11 | 474 | 219 | 438 | 318 | 99 | 45.1 |
| 1 | 431 | 163 | 410 | 282 | 119 | 73.0 |
| 10 | 446 | 183 | 467 | 332 | 149 | 81.4 |
| 6 | 460 | 134 | 467 | 332 | 199 | 148.5 |

[1] This glass is not within the range of compositions set forth above, as contemplated by the instant invention. It is representative of a class of presently commercial fiberizable glasses which contain a high proportion of $B_2O_3$.

TABLE III

| Composition No. | Fiber Binder Test Results | | | | Increase in Wet Strength with Silane | |
|---|---|---|---|---|---|---|
| | Without Silane | | With Silane | | | |
| | Dry | Wet | Dry | Wet | Grams | Percent |
| 3 | 391 | 115 | 438 | 382 | 267 | 232 |
| 7 | 446 | 191 | 452 | 375 | 184 | 96.4 |
| 9 | 436 | 162 | 432 | 368 | 206 | 127.2 |

TABLE IV

| Composition No. | Fiber Binder Test Results with Silane | |
|---|---|---|
| | Dry | Wet |
| 3 | 530 | 445 |
| 4 | 465 | 395 |

TABLE V

| Composition No. | Fiber Binder Test Results | | | | Increase in Wet Strength with Silane | |
|---|---|---|---|---|---|---|
| | Without Silane | | With Silane | | | |
| | Dry | Wet | Dry | Wet | Grams | Percent |
| 2 | 388 | 243 | 446 | 386 | 143 | 58.9 |
| 11 | 351 | 189 | 438 | 313 | 124 | 65.5 |
| Control [1] | 429 | 228 | 431 | 327 | 99 | 43.4 |
| Control [2] | 369 | 264 | 394 | 335 | 71 | 27.3 |

[1] The composition of this glass is outside the range contemplated by the instant invention, being one suggested by the previously identified Dingledy patent. Data are presented for purposes of comparison.
[2] The composition of this glass is outside the range contemplated by the instant invention. So far as is known, this glass has never been used commercially to produce fibers, or suggested in a printed publication for such purpose. The glass had the following percent composition:

$SiO_2$ ---------------------------------------------------- 53.0
$Al_2O_3$ -------------------------------------------------- 10.0
CaO ------------------------------------------------------ 20.0
MgO ------------------------------------------------------ 7.0
$Na_2O$, $K_2O$ and $Li_2O$ ------------------------------ 9.

Corresponding improvements can also be demonstrated for glass compositions 5 and 8, for which data are not specifically presented in the foregoing tables. In addition, extensive and prolonged testing of glass fiber wool products and glass fiber board products produced under commercial conditions, and using aqueous dispersions of phenolic resole binder compositions to which the indicated amount of gamma-amino propyl triethoxy silane had been added has demonstrated the reliability of the fiber binder test to demonstrate satisfactory durability for such products. The proportions of $Na_2O$, $K_2O$ and $Li_2O$ to one another, so long as the total amount of these oxides is within the limit indicated above, have been found to be unimportant, and can be governed by local availability and cost considerations. It has also been demonstrated that all known commercially available amino alkyl silanes having the following generic formula are substantially equivalent to gamma-amino propyl triethoxy silane:

$$R_n—Si(—O—R')_{(4-n)}$$

wherein R is an amino alkyl radical chemically bonded to the silicon atom, R' is an alkyl radical having from 1 to 4 carbon atoms, and $n$ is an integer from 1 to 3, inclusive. Specifically, fully equivalent results have been achieved using a silane having the following formula:

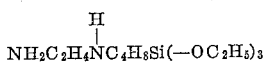

A preferred class of such silanes is one wherein R has the formula H₂N—R″ where R″ is an alkylene radical having from 2 to 6 carbon atoms. Another such preferred class is one wherein R has the formula

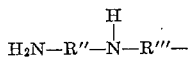

where R″ and R‴ are both alkylene radicals having from 2 to 6 carbon atoms.

It will be apparent that various changes and modifications can be made from the specific details set forth in the foregoing examples and discussed herein without departing from the spirit and scope of the invention as defined in the appended claims.

What I claim is:

1. Glass fibers having a hardened, adhesive, resite coating on their surfaces, said coating having been formed by hardening of an aqueous phenolic resole binder composition to which had been added from 0.02 percent to 2.0 percent, based upon binder solids, of gamma-amino propyl triethoxy silane, said fibers being of a glass which consists essentially of the following constituents in the indicated proportions and being subject to substantial deterioration by moisture:

| | Percent |
|---|---|
| SiO₂ | 53 to 62 |
| Al₂O₃ | 4 to 8 |
| CaO | 19 to 21 |
| MgO | 6 to 8 |
| Na₂O, K₂O and Li₂O | 9 to 13 |
| B₂O₃ | Up to 2 |
| TiO₂ | Up to 0.5 |
| MnO | Up to 0.5 | and wherein the sum of the percentages of SiO₂ and Al₂O₃ as well as of SiO₂, Al₂O₃ and B₂O₃ is from 59 to 66 to provide coated fibers having high wet strength.

2. Glass fibers having a hardened, adhesive, resite coating on their surfaces, said coating having been formed by hardening of an aqueous phenolic resole binder composition to which had been added from 0.02 percent to 2.0 percent, based upon binder solids, of a silane having the formula

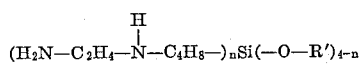

wherein R′ is an alkyl radical having from 1 to 4 carbon atoms, and n is an integer from 1 to 3, inclusive, and said fibers being of a glass which consists essentially of the following constituents in the indicated proportions and being subject to substantial deterioration by moisture:

| | Percent |
|---|---|
| SiO₂ | 53 to 62 |
| Al₂O₃ | 4 to 8 |
| CaO | 19 to 21 |
| MgO | 6 to 8 |
| Na₂O, K₂O and Li₂O | 9 to 13 |
| B₂O₃ | Up to 2 |
| TiO₂ | Up to 0.5 |
| MnO | Up to 0.5 | and wherein the sum of the percentages of SiO₂ and Al₂O₃ as well as of SiO₂, Al₂O₃ and B₂O₃ is from 59 to 66 to provide coated fibers having high wet strength.

3. Glass fibers having a hardened, adhesive, resite coating on their surfaces, said coating having been formed by hardening of an aqueous phenolic resole binder composition to which had been added from 0.02 percent to 2.0 percent, based on binder solids, of a silane having the following general formula $$(T—)_nSi(—O—R')_{4-n}$$

wherein T is an amino alkyl radical having from 2 to 12 carbon atoms chemically bonded to silicon, R′ is an alkyl radical having from 1 to 4 carbon atoms, and n is an integer from 1 to 3, inclusive, and said fibers being of a glass which consists essentially of the following constituents in the indicated proportions and being subject to substantial deterioration by moisture:

| | Percent |
|---|---|
| SiO₂ | 53 to 62 |
| Al₂O₃ | 4 to 8 |
| CaO | 19 to 21 |
| MgO | 6 to 8 |
| Na₂O, K₂O and Li₂O | 9 to 13 |
| B₂O₃ | Up to 2 |
| TiO₂ | Up to 0.5 |
| MnO | Up to 0.5 | and wherein the sum of the percentages of SiO₂ and Al₂O₃ as well as of SiO₂, Al₂O₃ and B₂O₃ is from 59 to 66 to provide coated fibers having high wet strength.

4. Glass fibers having a hardened, adhesive, resite coating on their surfaces, said coating having been formed by hardening of an aqueous phenolic resole binder composition to which had been added from 0.02 percent to 2.0 percent, based upon binder solids, of gamma-amino propyl triethoxy silane, wherein the sum of gamma-amino propyl and ethoxy groups is 4, said fibers being of a glass which consists essentially of the following constituents in substantially the indicated proportions and being subject to substantial deterioration by moisture:

| | Percent |
|---|---|
| SiO₂ | 56¼ |
| Al₂O₃ | 5½ |
| CaO | 20 |
| MgO | 7 |
| Na₂O, K₂O and Li₂O | 10½ |
| MnO | ⅓ |
| TiO₂ | ¼ |
| Fe₂O₃ | ¼ |
| B₂O₃ | Up to 2 |
| TiO₂ | Up to 0.5 |
| MnO | Up to 0.5 | and wherein the sum of the percentages of SiO₂ and Al₂O₃ as well as of SiO₂, Al₂O₃ and B₂O₃ is from 59 to 66 to provide coated fibers having high wet strength.

References Cited by the Examiner

UNITED STATES PATENTS

| | | | |
|---|---|---|---|
| 2,116,303 | 5/1938 | Coss | 105—50 |
| 2,308,857 | 1/1943 | Bowes | 106—50 |
| 2,349,909 | 5/1944 | Meharg | 117—126 |
| 2,541,896 | 2/1951 | Vasileff et al. | 117—126 |
| 2,664,359 | 12/1953 | Dingledy | 106—50 |
| 2,676,898 | 4/1954 | Folger et al. | 117—126 |
| 2,698,260 | 12/1954 | Meauze et al. | 117—126 |
| 2,758,101 | 8/1956 | Shappell | 260—29.3 |
| 2,921,950 | 1/1960 | Jex et al. | 117—124 |
| 2,932,587 | 4/1960 | Labino | 260—29.3 X |
| 2,946,701 | 7/1960 | Plueddemann | 117—126 |
| 2,971,864 | 2/1961 | Speier | 117—126 |
| 2,974,062 | 3/1961 | Collier | 117—126 |
| 2,990,307 | 6/1961 | Stalego | 117—126 |
| 3,013,888 | 12/1961 | Lajarte | 106—50 |

(Other references on following page)

UNITED STATES PATENTS

| | | | |
|---|---|---|---|
| 3,033,815 | 5/1962 | Pike et al. | 260—448.2 |
| 3,045,036 | 7/1962 | Jex et al. | 260—448.2 |
| 3,072,595 | 1/1963 | Barth et al. | 117—126 |
| 3,081,195 | 3/1963 | Biefeld et al. | 117—126 |
| 3,081,207 | 3/1963 | Fox | 117—126 |

FOREIGN PATENTS

| | | |
|---|---|---|
| 544,555 | 2/1956 | Belgium. |
| 625,992 | 8/1961 | Canada. |
| 765,244 | 1/1957 | Great Britain. |
| 816,056 | 7/1959 | Great Britain. |
| 882,062 | 11/1961 | Great Britain. |

OTHER REFERENCES

Martin, The Chemistry of Phenolic Resins, John Wiley and Sons, Inc., London, 1956, pp. 87–98, TP–978–M38 C4.

Sidlovsky, Silicones in the Fiber Glass Industry, The Glass Industry, September 1960, pp. 499–501 and 524.

WILLIAM D. MARTIN, *Primary Examiner.*

RICHARD D. NEVIUS, *Examiner.*